United States Patent [19]

Ezaki et al.

[11] 4,069,721
[45] Jan. 24, 1978

[54] MECHANISM FOR JOINING A CABLE TO A LINK LEVER

[75] Inventors: Toshi Ezaki; Hisahalu Mineda, both of Toyota, Japan

[73] Assignee: Toyota Jidosha Kogyo Kabushiki Kaisha, Toyota, Japan

[21] Appl. No.: 678,892

[22] Filed: Apr. 21, 1976

[30] Foreign Application Priority Data
Apr. 28, 1975 Japan .............................. 50-56783[U]

[51] Int. Cl.² .............................................. F16C 1/14
[52] U.S. Cl. .................................. 74/501 R; 74/89.2; 403/152
[58] Field of Search ..................... 74/501 R, 502, 89.2; 403/152, 150, 315, 316

[56] References Cited
U.S. PATENT DOCUMENTS

| | | | |
|---|---|---|---|
| 1,058,987 | 4/1913 | Labudde | 403/152 |
| 2,365,520 | 12/1944 | Bogue | 403/315 |
| 3,241,393 | 3/1966 | Norcross | 74/501 |
| 3,472,096 | 10/1969 | Krause | 74/501 |

Primary Examiner—Alan Cohan
Attorney, Agent, or Firm—Stevens, Davis, Miller & Mosher

[57] ABSTRACT

A mechanism for joining a cable to a link lever which may be pivoted about its pivotal point by a suitable mechanical means, said mechanism comprises a groove provided in said link lever at a position away from said pivotal point, a cable anchoring member rigidly attached to a free end of said cable and being engageable in said groove, and a retaining means for retaining said cable anchoring member in said groove of said link lever.

7 Claims, 7 Drawing Figures

MECHANISM FOR JOINING A CABLE TO A LINK LEVER

The present invention relates to a mechanism for joining a cable to a link lever, and more particularly to a mechanism for joining a cable to a link lever which may be pivoted about a pivotal point by a suitable mechanical means.

Many such conventional mechanisms use a bolt and a nut, or a pin and a cotter. These conventional mechanisms, however, make the cable joining or removing operation complicated and troublesome. Another disadvantage involved in the prior arts is that the components required for the purpose of cable joining are extensive in number.

The object of the present invention is to overcome these disadvantages peculiar to such prior arts and to provide a novel device which permits to join more easily a cable to a link lever and, at the same time, to reduce the number of necessary components.

According to the present invention, the object is attained by a novel mechanism for joining a cable to a link lever pivotable about its pivotal point by a suitable mechanical means, said mechanism comprises a groove provided in said link lever at a position away from said pivotal point, a cable anchoring member rigidly attached to a free end of said cable and being engageable in said groove, and a retaining means for retaining said cable anchoring member in said groove of said link lever.

The present invention will be further explained hereinafter in a comparison with a prior art and with reference to the accompanying drawings wherein.

Figure 5:
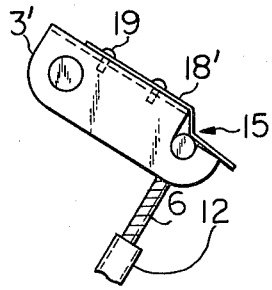
Figure 6:
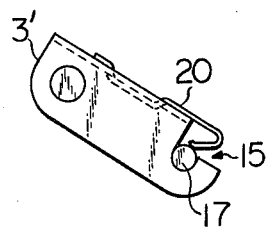
Figure 7:
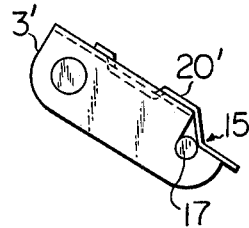

FIGS. 5, 6 and 7 respectively show other embodiments according to the present invention.

Figure 1:
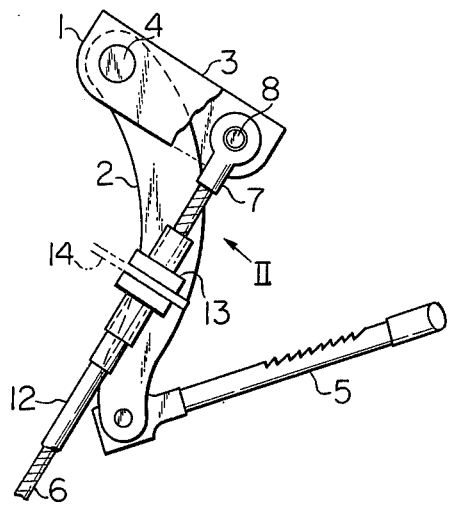
FIG. 1 is a schematic side elevation of a conventional structure for joining a cable to a brake lever.
Figure 2:
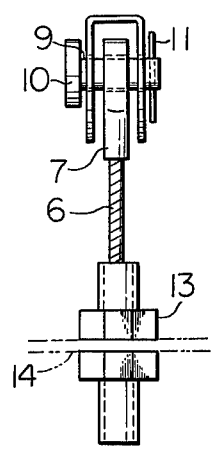
FIG. 2 is an enlarged end view of said structure as viewed in the direction of arrow II.

In FIG. 1, the link lever 1 comprises two members 2 and 3 which as a whole may be pivoted about a pivotal point 4. The link lever 1 is pivoted by means of a plunger 5 connected to the one end of the member 2. The plunger 5 is in turn connected to a handle member of a parking brake mechanism (not shown). At the free end of the cable 6 is secured a cable anchoring member 7 having an opening 8 which allows a pin 10 (shown in FIG. 2) to pass through. In order to join the cable 6 to the link lever 1, an opening 9 provided in the member 3 of the lever 1 is aligned to the opening 8 of the cable anchoring member 7 and then the pin 10 of FIG. 2 is passed through the aligned openings 8 and 9. After that, to keep the pin 10 in position, a cotter 11 is inserted into the pin 10 as seen in FIG. 2. In the manner as shown in FIG. 1, the jacket sleeve 12 surrounding the cable 6 is fixed on a stationary bracket 14.

As shown in FIGS. 1 and 2, the above-mentioned conventional method inevitably needs three different steps, namely, to align the opening 8 in the cable anchoring member 7 with the opening 9 provided in the member 3 of the link lever 1, to pass the pin 10 through the aligned openings 8 and 9 and to insert the cotter 11. This makes the cable joining or removing operation complicated and troublesome. Another disadvantage involved in the prior art is found in the fact that the components required for the purpose of cable joining are extensive in number.

Figure 3:
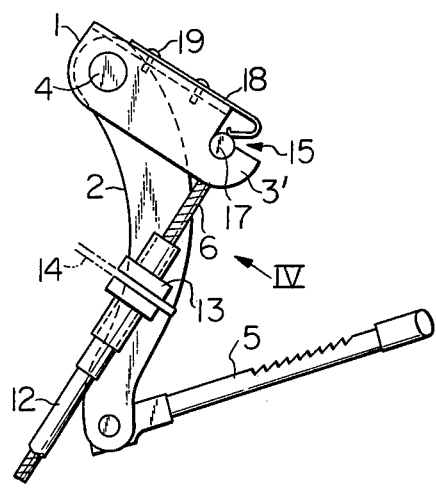
FIG. 3 is a schematic side elevation of a novel mechanism for joining a cable to a brake lever, showing a first embodiment according to the present invention.
Figure 4:
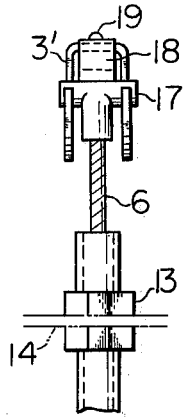
FIG. 4 is an enlarged end view of the mechanism as viewed in the direction of arrow IV.

The first embodiment according to the present invention is illustrated in FIGS. 3 and 4. FIG. 3 corresponds to FIG. 1 and is a schematic view of a parking brake mechanism, showing only a portion where an associated brake lever and cable are joined together according to the present invention. FIG. 4 is an enlarged end view of the parking brake, which also corresponds to FIG. 2 previously referred to. As shown in FIG. 3, the link lever 1, like that shown in FIG. 1, comprises two members 2 and 3' which as a whole may be pivoted about a pivotal point 4. The link lever 1 is pivoted by means of a plunger 5. This plunger is connected to a handle member of said parking brake mechanism located in a driver's room (not illustrated). A groove 15 is provided in the member 3' of the link lever at a position away from the pivotal point 4, as seen in FIG. 3. In the groove 15, a cable anchoring member 17 is engaged. The cable anchoring member has a simple structure as shown in FIG. 4 and is securely attached to the free end of the cable 6 in a well-known manner by using a welding or fusing technique. The jacket sleeve 12 surrounding the cable 6 is fixed on a stationary bracket 14 with a nut 13, this fixing method being similar to the conventional one shown in FIGS. 1 and 2.

According to the feature of the present invention, a leaf spring 18 containing a free end portion shaped in the form of a V is mounted on the member 3' of the link lever 1. After the cable anchoring member 17 has been engaged in the groove 15, the leaf spring 18 retains the cable anchoring member in the groove by virtue of a portion of one side of said V and prevents the former from dropping out of the latter. In the case of the first embodiment shown in FIGS. 3 and 4, the leaf spring 18 is mounted securely on the member 3' by using binding screws 19. However, welding or rivetting may be adopted for this purpose.

In FIGS. 5, 6 and 7, other embodiments according to the present invention are illustrated. The embodiment in FIG. 5 is different from that shown in FIGS. 3 and 4, in that the free end portion of leaf spring 18' is shaped like a step or a crank; however, the remaining portions of the embodiments are identical. FIG. 6 shows an embodiment in which a wire spring 20 is provided instead of the leaf spring. But the shape of the wire spring 20 is similar to that of the leaf spring illustrated in FIG. 3. The embodiment in FIG. 6 is different from the above-mentioned embodiments in that no binding screws are used to fix the spring member to the member 3'; instead, caulking is utilized. Again, in the embodiment in FIG. 7, a wire spring 20' is used in stead of the leaf spring, the shape of said wire spring 20' being similar to that of the leaf spring 18' illustrated in FIG. 5. The wire spring 20' is attached to the member 3' in the same manner as that shown in FIG. 6.

As seen in the foregoing description, the novel mechanism according to the present invention permits to easily join a cable to a link lever through a so-called one-touch operation. To join the cable to the link lever, one has only to insert the cable anchoring member 17 into the groove 15 along the spring members 18, 18', 20 or 20' and against the elasticity thereof. Also when it is necessary to detach the cable 6 of FIG. 5 from the groove 15, the cable 6 may be simply withdrawn from the groove 15 against the elasticity of the spring 18, 18', 20 (not shown in FIG. 7) or 20'.

According to the present invention, many advantages are obtained, such as the easy joining of a cable to a link lever and the reduction in number of necessary components, which leads to a substantial reduction in cost.

What is claimed is:

1. A mechanism for joining a cable to a link lever which may be pivoted about its pivotal point by a control lever for a parking brake, said cable being connected to a brake element, said mechanism comprising a groove provided in said link lever at a position away from said pivotal point, said groove having a substantially semi-circular portion, a wall portion connected to said semi-circular portion at the near side of said pivotal point and lying substantially perpendicular to the longitudinal surface of said link lever, and a flat portion connected to said semi-circular portion at the far side of said pivotal point and lying substantially parallel to said longitudinal surface, a cylindrical cable anchoring member rigidly attached to a free end of said cable and being engageable with said semi-circular portion of said groove, and a spring retaining member for retaining said cable anchoring member in said semi-circular portion of said groove, one end of said retaining member being securely mounted on said link lever and a free end portion thereof extending over said groove including said flat portion and defining with respect to said flat portion a predetermined angle whereby said cylindrical cable anchoring member can be easily engaged in said groove by inserting the cable anchoring member between said free end portion of the retaining member and said flat portion.

2. A mechanism as set forth in claim 1, wherein said spring retaining member has a V-shaped configuration at the free end portion thereof and one portion of a side of said V presses said cylincrical cable anchoring member into said semi-circular portion of the groove.

3. A mechanism as set forth in claim 2, wherein said retaining member comprises a leaf spring securely mounted on said link lever by fastening means.

4. A mechanism as set forth in claim 2, wherein said retaining member comprises a wire spring securely mounted on said link lever by caulking.

5. A mechanism as set forth in claim 1, wherein said spring retaining member has a step-shaped configuration at the free end portion thereof, said free end portion of said spring retaining member extends beyond said flat portion of said groove, and said step-shaped portion presses said cylindrical cable anchoring member into said semi-circular portion of the groove.

6. A mechanism as set forth in claim 5, wherein said retaining member comprises a leaf spring securely mounted on said link lever by fastening means.

7. A mechanism as set forth in claim 5, wherein said retaining member comprises a wire spring securely mounted on said link lever by caulking.

* * * * *